Sept. 28, 1965  M. C. HESSE  3,208,677

GRAIN ROLLER MILL

Filed Feb. 6, 1963  2 Sheets-Sheet 1

INVENTOR
MYRON C. HESSE

BY *Wright & Wright*

ATTORNEYS

Sept. 28, 1965    M. C. HESSE    3,208,677
GRAIN ROLLER MILL
Filed Feb. 6, 1963    2 Sheets-Sheet 2
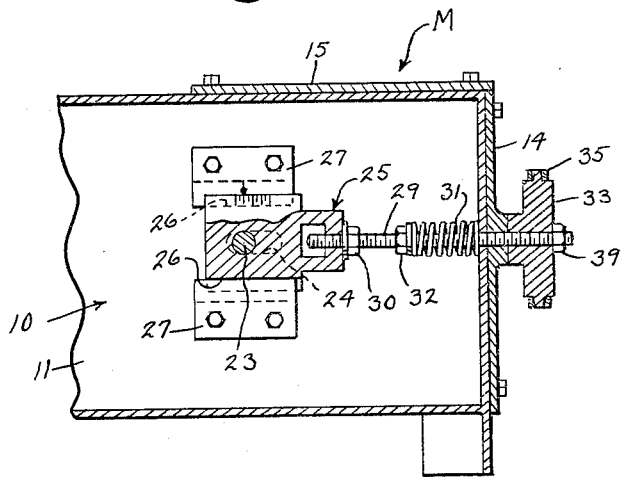
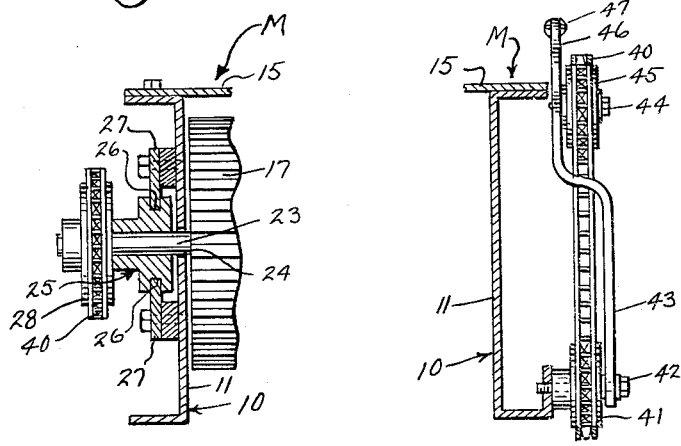
INVENTOR
MYRON C. HESSE
BY *Wright and Wright*
ATTORNEYS United States Patent Office 3,208,677
Patented Sept. 28, 1965

3,208,677
GRAIN ROLLER MILL
Myron C. Hesse, Pender, Nebr.
Filed Feb. 6, 1963, Ser. No. 256,652
2 Claims. (Cl. 241—230)

This invention appertains to grain roller mills and more particularly to a mill embodying a pair of power driven fluted or toothed rolls for receiving the grain to be processed therebetween.

Much difficulty has been experienced in producing a roller mill which will effectively handle various types of grain and bring about the desired cracking and rolling of the grain for the best use thereof for feed and other purposes. Different grains vary in size, shape, toughness and moisture content, and in fact, the same variety of grain differs from one locality to another.

It is therefore, one of the primary objects of my invention to provide an all purpose mill which will effectively handle all kinds of grain by the mere adjustment of one roll relative to the other, and by mounting the adjustable roll in such a manner that the same will give or float toward and away from the other roll to automatically adjust itself to various types of grains after the primary adjustment thereof.

Another prime object of the invention is to provide a roller mill which will also effectively handle shelled corn and broken cobs and corn, by providing means whereby one roll can be adjusted and held out of mesh, with the other roll, and by driving such roll at a faster rate of speed than the other roll and thereby producing a so-called "steel cut" method, which effectively cuts the kernels clean and sharp without crushing, and which will also cut cobs and corn kernels into minute fragments.

A further object of the inevntion is to provide a novel chain and sprocket wheel drive from the driven roll to the other roll, whereby to bring about a desired fast drive of one roll over the other roll when the rolls are out of mesh, with a novel means for holding the chain taut including a swinging lever carrying an idler sprocket, so mounted as to allow the idler sprocket to be swung entirely out of the way and below the chain to permit the quick removal and replacing of the chain for either fast drive of one roll or equal rate of drive of both rolls when the rolls have their teeth intermeshed.

A still further object of the invention is to provide novel means for supporting and adjusting the floating roll including slide bearings for each end of the roll with tension means for each bearing to normally urge the roll toward its companion roll, and means for simultaneously and equally adjusting the slide bearings to initially position the floating roll relative to its companion roll.

Another still further object of the invention is to provide a novel tension and slack take-up means for the chain when the chain is used for a fast drive of one roll over the other, normally positioned in a raised vertical plane above the sprockets of the drive and with means for swinging the same to a lowered position completely out of the way, to permit the quick removal of the chain from the sprockets or replacing the same back on the sprockets.

With these and other objects in view, the invention consists in the novel construction, arrangement and formation of parts as will be hereinafter more specifically described and claimed, and illustrated in the accompanying drawings, in which drawings, FIGURE 1 is a side elevational view of my improved roller mill;

FIGURE 3 is an enlarged fragmentary detail vertical sectional view taken on the line 3—3 of FIGURE 2, looking in the direction of the arrows, illustrating the tension and adjusting means for one bearing;

FIGURE 4 is a detail fragmentary transverse sectional view through the mill, taken on the line 4—4 of FIGURE 1, the view illustrating the mounting of the slide bearing on the frame of the mill, and FIGURE 5 is a detail fragmentary transverse sectional view taken on the line 5—5 of FIGURE 1, looking in the direction of the arrows, illustrating the novel tension, drive chain slack take-up.

Figure 1:
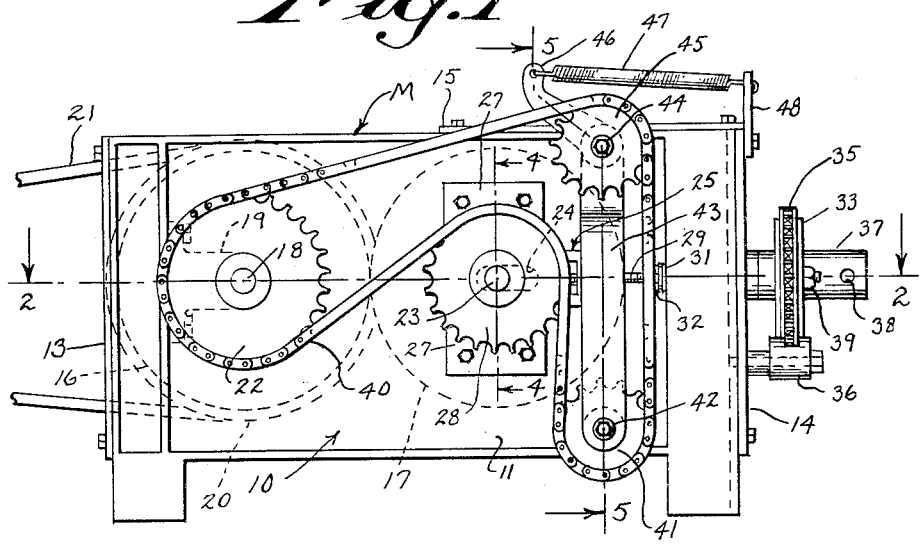
Figure 2:
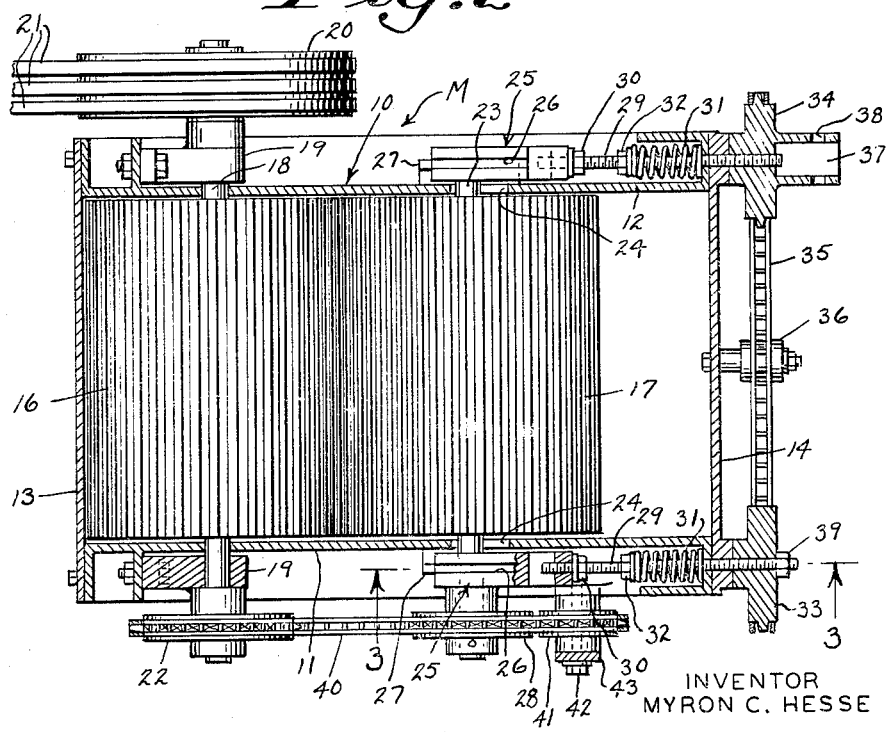
FIGURE 2 is a horizontal sectional view through the mill, taken on the line 2—2 of FIGURE 1, looking in the direction of the arrows, the view illustrating more particularly the novel arrangement of the slide bearings for one roll and the tension and adjusting means therefor.

Refering to the drawings in detail, wherein similar reference characters designate corresponding parts throughout the several views, the letter M generally indicates my improved roller mill, and the same includes a main frame 10 for supporting the various parts of the mill. This frame can be fabricated in different manners, best suited for the purpose, and as illustrated the same includes spaced parallel longitudinally extending side plates 11 and 12 of like character. The opposite ends of the side plates 11 and 12 have rigidly secured thereto end plates 13 and 14. The upper edges of the side plates can also carry a partial top plate 15 which is located at one end of the frame. This forms a box or housing for rotatably receiving and supporting a pair of like milling rolls 16 and 17. Each roll is provided with a like number of longitudinally extending equally spaced cutting teeth or ribs. In some instances, the teeth of the rolls are intermeshed so that one roll will drive the other, and in other instances the teeth of the rolls are spaced a slight distance and this will be more particularly pointed out as the description proceeds. The side plates 11 and 12 are provided with suitable mounting flanges and ribs for various parts of the mill as will also be later seen.

In actual practice, a hopper with a regulating gate can be provided for supplying the grain at a desired rate between the rolls 16 and 17. The hopper and gate are not shown in the present instance. The roller mill can also be used with other machinery and adjuncts, such as my ear corn and cob cutter, as shown and illustrated in my co-pending application, entitled "Breaker and Shredding Cylinder for Ear Corn," Serial No. 244,115, filed December 12, 1962. When the roller mill is utilized for processing broken ear corn and cobs, the mill is located directly below the breaking and shredding cylinder and the two are united and driven for mutual cooperation.

The roll 16 is fastened to a rotatable shaft 18 mounted in bearings 19 securely bolted to supporting flanges on the side plates 11 and 12. One end of the shaft has keyed or otherwise secured thereto a pulley wheel 20 adapted to be driven by belts 21 leading from a suitable driving source. The other end of the shaft has keyed or otherwise secured thereto a sprocket wheel 22 of a certain size and diameter, as will be later pointed out.

The roll 17 is fastened to a shaft 23 and this shaft extends through slots 24 formed in the side plates 11 and 12, and these slots provide means whereby the roll 17 can be moved toward and away from the roll 16. The opposite ends of the shaft 23 are rotatably mounted in slide bearings 25 and these bearings can be adjusted back and forth to initially position the cylinder 17 relative to the cylinder 16. The slide bearings 25 have formed in their upper and lower faces longitudinally extending guideways 26. Mounted in the guideways 26 are upper and lower guide plates 27 which are bolted or otherwise fastened to the outer faces of the side frame plates 11 and 12. One end of the shaft 23 has keyed or otherwise secured thereto a sprocket wheel 28, which is of a certain size, as will be later pointed out.

Means is provided for adjusting the slide blocks 25 back and forth, so as to set the roll 17 relative to the roll 16, and for providing tensioning means for normally urging and holding the roll 17 in such initially set position. This means includes threaded rods 29 located on each side of the frame. The rods are firmly connected to the slide blocks 25 and are locked in an adjusted position to the slide blocks by lock nuts 30. Coiled around the rods 29 are tension expansion springs 31. The outer ends of the springs bear against flanges on the frame plates and the forward ends thereof bear against washers which are held in a certain selected position by lock nuts 32 threaded on the rods. Thus, the springs normally urge the slide blocks forward and the tension of these springs is preferably set at the factory. The outer ends of the rods 30 slidably extend through the frame plates and threaded on the rods are sprocket wheels 33 and 34. These sprocket wheels function as feed nuts and the sprockets are interconnected for simultaneous and equal movement by a sprocket chain 35. One run of the chain (the lower one in the present instance) is engaged by a movable cam 36 which functions as a chain slack take-up. The combined sprocket 34 and feed nut has formed thereon a sleeve 37 having openings 38 for the reception of a bar or handle to permit the turning of the sprocket and movement of the sprocket 34 will be imparted to the sprocket 33 by the chain 35. Thus, by turning the sprocket 34 the rods 29 can be moved equally back and forth to bring about the desired and correct positioning of the roll 17 relative to the roll 16 for different purposes. After the setting of the roll 17 to a desired position, I prefer to lock the sprockets 33 and 34 against turning movement relative to the rods 29. Hence, a lock nut 39 can be threaded on a rod 29 tight against the sprocket 33. With the rods set in a selected adjusted position, the roll 17 is held against further movement toward the roll 16, but the roll 17 can move back against the tension of the springs 31 so that the same will automatically adjust itself to differences in grain and to permit the passage of hard objects between the roller, without injury to the teeth thereof.

Considering that the rolls are set so that their teeth intermesh, then the roll 16 will drive the roll 17 and these rolls will be driven at an equal rate.

Where the mill is to be used for broken corn cobs, cobs and kernels etc. the roll 17 is then adjusted so that the teeth of the rolls will just clear one another. This spacing is preferably 1/32 of an inch. With this setting, the roll 17 will not be driven from the roll 16 by the intermeshing of their teeth and I provide a novel chain drive for the roll 17 from the roll 16. This drive includes a sprocket chain 40, which is trained about the sprocket wheels 22 and 28. It now can be seen that the sprocket wheel 22 is of a larger size than the sprocket wheel 28 so that the sprocket wheel 28 and consequently the roll 17 will be driven at a higher rate of speed than the roll 16. One preferred ratio sprocket wheel size, is to have the wheel 22 provided with twenty-four teeth and the wheel 28 with twenty teeth.

In view of the fact that the chain 40 is not used in all instances, it is necessary and desirable to have the chain so mounted that the same can be quickly removed or replaced on the sprockets 22 and 28. To bring this about, I provide a lower idler sprocket wheel 41 rotatably mounted on a stub shaft 42 carried by the side frame plate 11. This idler sprocket is located below the sprocket wheels 22 and 28 and of course, the chain is trained thereover. Rockably mounted on the stub shaft 42 for swinging movement is a lever 43 and this lever carries at its upper end a stub shaft 44 on which is rotatably mounted an idler sprocket 45. The chain is trained over this idler sprocket and the same is normally located directly above the lower idler sprocket 41. Formed on the upper end of the lever 43 is a crank 46 and this crank has anchored thereto the forward end of a contractile coil spring 47. The other end of the coil spring is anchored to a plate 48, which is in turn, secured to the frame. Thus the lever 43 is normally held in a raised vertical position and to the right, see FIG. 1, and hence the chain is normally held in a taut position irrespective of the adjustment of the roll 17. By mounting the lever 43 in the manner shown, the idler sprocket wheel 45 can be swung down to a complete lowered position out of engagement with the sprocket chain 40. This provides a desired and sufficient slack in the chain whereby the same can be quickly removed from the machine, and off of the sprocket wheels 22 and 28.

Great stress is laid on the arrangement of the lever 43, its idler sprocket 45 and the spring 47 as it is by this arrangement that the sprocket chain 40 can be quickly placed in position or removed from the sprocket wheels. Great stress is also laid on the fact that by adjusting the roll 17 slightly away from the roll 16 and by utilizing the chain 40, that the roll 17 can be driven at a higher rate of speed than the roll 16. This allows the mill to be effectively used with broken corn cobs, corn kernels and the like and the rolls will function to give a desired "steel cut" and the kernels are cut clear and sharp. With this arrangement of the fast drive, for one roll I have also found out that less power is required to drive the rolls for heavy work.

Again it can be seen that I have provided means for adjusting the roll 17, for permitting the roll to float and have provided means for taking up slack in a drive sprocket chain irrespective of the adjustment of the roll with such means being so arranged as to permit the quick replacing and removing of the drive sprocket chain.

Changes in details may be made without departing from the spirit or the scope of this invention, but what I claim as new is:

1. A roller mill comprising a frame, a pair of transversely aligned bearings rigidly carried by the frame, a roll rotatably carried by said bearings, means for driving said roll, a pair of transversely aligned slide bearings mounted on the frame for movement toward and away from the first bearings, a second roll rotatably mounted in said slide bearings for movement therewith, spring means normally urging the slide bearings toward the first bearings and the second roll toward the first roll with either the second roll in mesh with the first roll or out of mesh therewith, sprocket wheels of different sizes carried by the first and second rolls, a sprocket chain trained over said sprocket wheels for driving the second roll from the first roll when the rolls are out of mesh, a lower idler sprocket engaging said chain below the first sprockets, a lever rockably mounted on the frame and extending upwardly and terminating above said first sprockets and having rotatably mounted thereon an upper idler sprocket engaging the chain, spring means normally holding the lever in a raised position with the chain taut, and said lever being movable against the tension of said spring to a lowered position with its idler sprocket completely out of engagement with the chain, whereby said chain can be quickly removed from the first sprockets or replaced thereon.

2. A roller mill comprising a frame, a pair of rotatable rolls in said frame, one of said rolls being mounted in stationary bearings and the other of said rolls being mounted in slide bearings, whereby said last mentioned roll can move toward and away from the first roll, means for driving the first roll, each of said rolls having like longitudinally extending teeth, means for simultaneously and equally adjusting the slide bearings to move the second roll toward and away from the first roll and with either the teeth of said second roll in mesh with the teeth of the first roll or out of mesh with the teeth of the first roll, the first roll driving the second roll with the teeth of the rolls meshed, means for driving the second roll from the first roll when the teeth are out of mesh including sprocket wheels carried by the rolls, a sprocket chain trained over said sprocket wheels, one of said sprocket wheels having less teeth than the other sprocket wheel whereby to bring about the driving of one roll faster than the other roll when the teeth are out of mesh, tension means for taking up slack in said chain irrespective of the adjustment or movement of said slide bearings, said tension means including, a swinging lever carrying an idler sprocket for normally engaging said chain, said lever and said idler sprocket being movable completely away and out of engagement with the chain to facilitate the removal and replacement of the chain off and on the sprocket wheels and means for each slide bearing normally urging the slide bearings to their set adjusted position.

References Cited by the Examiner

UNITED STATES PATENTS

| | | | |
|---|---|---|---|
| 258,027 | 5/82 | Davis | 241—230 |
| 259,479 | 6/82 | Case | 241—227 X |
| 264,869 | 9/82 | Finaz et al. | 241—101 X |
| 2,578,540 | 12/51 | Gundlach | 241—236 |

J. SPENCER OVERHOLSER, *Primary Examiner.*